US012675226B2

(12) United States Patent
Cheng et al.

(10) Patent No.: US 12,675,226 B2
(45) Date of Patent: Jul. 7, 2026

(54) HOSTS AND OPERATION METHODS THEREOF, MEMORY SYSTEMS AND OPERATION METHODS THEREOF, AND ELECTRONIC APPARATUS

(71) Applicant: Yangtze Memory Technologies Co., Ltd., Wuhan (CN)

(72) Inventors: Mo Cheng, Wuhan (CN); Tianyi Wang, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/892,339

(22) Filed: Sep. 21, 2024

(65) Prior Publication Data

US 2025/0328259 A1 Oct. 23, 2025

(30) Foreign Application Priority Data

Apr. 17, 2024 (CN) .......................... 202410465230.9

(51) Int. Cl.
*G06F 3/06* (2006.01)

(52) U.S. Cl.
CPC .......... *G06F 3/0619* (2013.01); *G06F 3/0613* (2013.01); *G06F 3/0659* (2013.01); *G06F 3/0679* (2013.01)

(58) Field of Classification Search
CPC .... G06F 3/0619; G06F 3/0613; G06F 3/0659; G06F 3/0679
See application file for complete search history.

(56) References Cited

U.S. PATENT DOCUMENTS

2022/0113905 A1* 4/2022 Agarwal ............... G06F 3/0631
2024/0168683 A1* 5/2024 Li ......................... G06F 3/0688

* cited by examiner

*Primary Examiner* — Eric Cardwell
(74) *Attorney, Agent, or Firm* — Hanley, Flight & Zimmerman, LLC

(57) ABSTRACT

Examples of the present disclosure disclose host and an operation method thereof, a memory system and an operation method thereof, and an electronic apparatus. The host is coupled with a memory system supporting a zone namespace function; the memory system includes a memory device, and the memory device includes K dies; the K dies are divided into N disturbance areas, each disturbance area includes at least one die, and one block in each die in the disturbance area constitutes a zone jointly; K and N are positive integers greater than or equal to 2; the host is configured to: send a command to the memory system to perform a respective operation on zones corresponding to the command at the same time, wherein the zones corresponding to the command belong to different disturbance areas.

18 Claims, 16 Drawing Sheets

10

62

66

64

Peripheral circuit

34

64

| Block0 | Block0 | Block0 | Block0 | — Large zone |
| Block1 | Block1 | Block1 | Block1 | — Large zone |
| Die0 | Die1 | Die2 | Die3 | |

FIG. 2

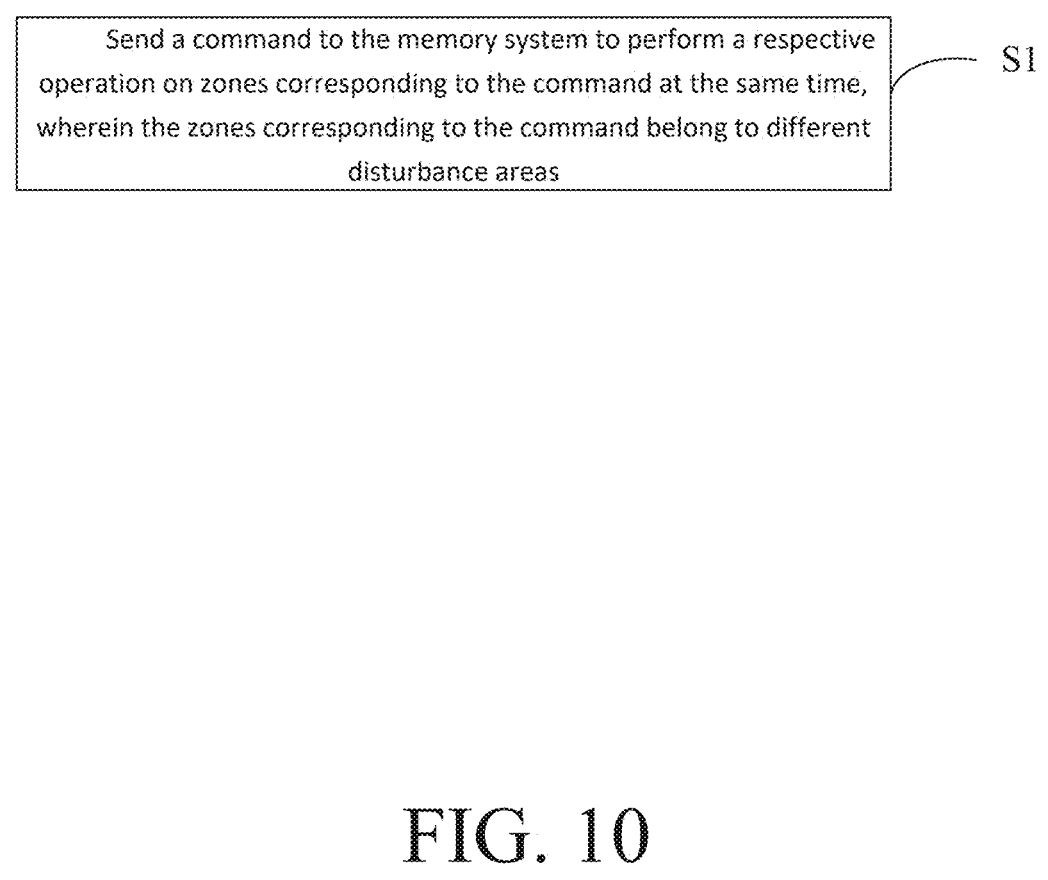

Send a command to the memory system to perform a respective operation on zones corresponding to the command at the same time, wherein the zones corresponding to the command belong to different disturbance areas —— S1

FIG. 10

HOSTS AND OPERATION METHODS THEREOF, MEMORY SYSTEMS AND OPERATION METHODS THEREOF, AND ELECTRONIC APPARATUS

CROSS-REFERENCE TO RELATED APPLICATIONS

This application claims priority to and the benefit of Chinese Patent Application 202410465230.9, filed on Apr. 17, 2024, which is hereby incorporated by reference in its entirety.

TECHNICAL FIELD

Examples of the present disclosure relate to a semiconductor technology, and particularly to, but not limited to, hosts and operation methods thereof, memory systems and operation methods thereof, and electronic apparatus.

BACKGROUND

As data storage technologies develop by leaps and bounds, increasingly more data memory systems are present in electronic apparatuses used by people, e.g., Solid State Drives (SSDs), etc. Because of characteristics such as fast read and write speeds, vibration resistance, low power consumption, noiselessness, low heat, and light weight, etc., the SSDs have been widely applied in military, vehicle, industry, medical and aviation fields, etc.

BRIEF DESCRIPTION OF THE DRAWINGS

In the drawings, like reference numerals may describe like components in different views. Like reference numerals having different letter suffixes may represent different examples of like components. The drawings generally illustrate the various examples discussed herein by way of examples rather than limitation.

FIG. 2 is a schematic diagram of a large-zone configuration pattern used by the memory system.

FIG. 10 is a flow diagram of an operation method of a host provided by examples of the present disclosure.

DETAILED DESCRIPTION

Figure 1A:
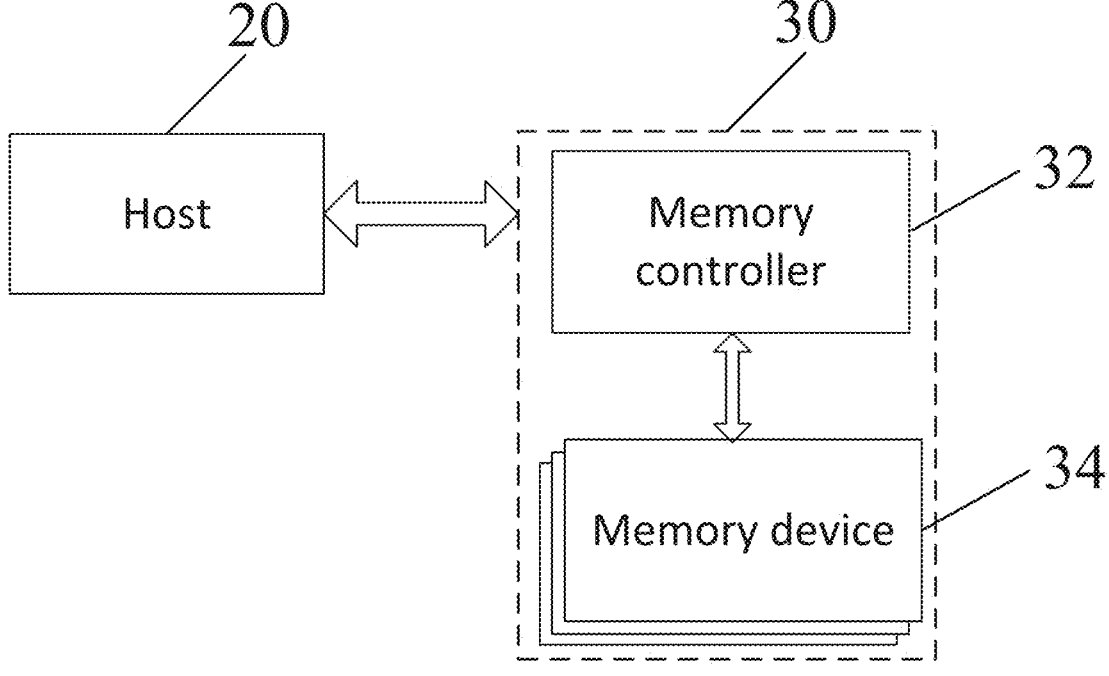
FIG. 1A is a schematic structural diagram of a memory system provided by examples of the present disclosure.

For ease of understanding the present disclosure, the present disclosure will be described in detail below with reference to the related drawings. Preferable examples of the present disclosure are given in the drawings. However, the present disclosure may be implemented in many different forms, and is not limited to the examples described herein. Instead, the purpose of providing these examples is to make the disclosure of the present disclosure more thorough and comprehensive.

Unless otherwise defined, all technical and scientific terms used herein have the same meanings as those generally understood by those skilled in the technical field of the present disclosure. The terms used in the specification of the present disclosure are only for the purpose of describing specific examples, and are not intended to limit the present disclosure. The term "and/or" used herein include any and all combinations of one or more listed associated items.

As shown in FIG. 1A, examples of the present disclosure show an example system 10. The example system 10 may comprise a host 20 and a memory system 30. The example system 10 may include, but is not limited to, a mobile phone, a desktop computer, a laptop computer, a tablet computer, a vehicle computer, a gaming console, a printer, a positioning apparatus, a wearable electronic apparatus, a smart sensor, a Virtual Reality (VR) apparatus, an Augmented Reality (AR) apparatus, or a system of any other suitable electronic apparatus having a memory 34. The host 20 may be a processor of an electronic apparatus (such as a Central Processing Unit (CPU), or a System on Chip (SoC) (such as an Application Processor (AP)).

In an example of the present disclosure, the host 20 may be configured to send or receive data to or from the memory system 30. Here, the memory system 30 may comprise a memory controller 32 and one or more memory devices 34. The memory device 34 may include, but is not limited to, a NAND Flash Memory, a Vertical NAND Flash Memory, a NOR Flash Memory, a Dynamic Random Access Memory (DRAM), a Ferroelectric Random Access Memory (FRAM), a Magnetoresistive Random Access Memory (MRAM), a Phase Change Random Access Memory (PCRAM), a Resistive Random Access Memory (RRAM), a Nano Random Access Memory (NRAM), etc.

In an example of the present disclosure, the memory controller 32 may be coupled to the memory device 34 and the host 20, and is configured to control the memory device 34. In an example, the memory controller 32 may be designed for operating in a low duty-cycle environment, such as Secure Digital (SD) cards, Compact Flash (CF) cards, Universal Serial Bus (USB) flash drives, or other media for use in electronic apparatuses, such as personal computers, digital cameras, mobile phones, etc. In some examples, the memory controller 32 may be also designed for operating in a high duty-cycle environment, such as SSDs or embedded Multi-Media Cards (eMMCs) used as data memories for mobile apparatuses, such as smartphones, tablet computers, laptop computers, etc., and enterprise memory arrays.

Furthermore, the memory controller 32 may manage data in the memory device 34, and communicate with the host. The memory controller 32 may be configured to control read, erase and program operations of the memory device 34, may further be configured to manage various functions with respect to data stored or to be stored in the memory device 34, including, but not limited to, bad-block management, garbage collection, logical-to-physical address conversion, wear leveling, etc., and may further be configured to process Error Checking and Correction (ECC) with respect to the data read from or written to the memory device 34. Furthermore, the memory controller 32 may further perform any other suitable functions as well, e.g., formatting the memory device 34 or communicating with an external apparatus (e.g., the host 20 in FIG. 1A) according to a particular communication protocol. In an example, the memory controller 32 may communicate with the external host through at least one of various interface protocols, such as a USB protocol, an MMC protocol, a Peripheral Component Interconnect (PCI) protocol, a Peripheral Component Interconnect Express (PCI-E) protocol, an Advanced Technology Attachment (ATA) protocol, a serial-ATA protocol, a parallel-ATA protocol, a Small Computer System Interface (SCSI) protocol, an Enhanced Small Disk Interface (ESDI) protocol, an Integrated Development Equipment (IDE) protocol, a Firewire protocol, etc.

Figure 1B:
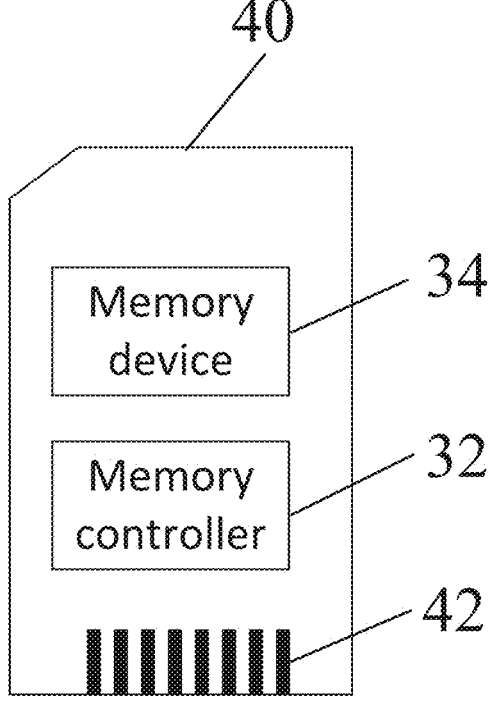
FIG. 1B is a schematic structural diagram of a memory card provided by examples of the present disclosure.
Figure 1C:
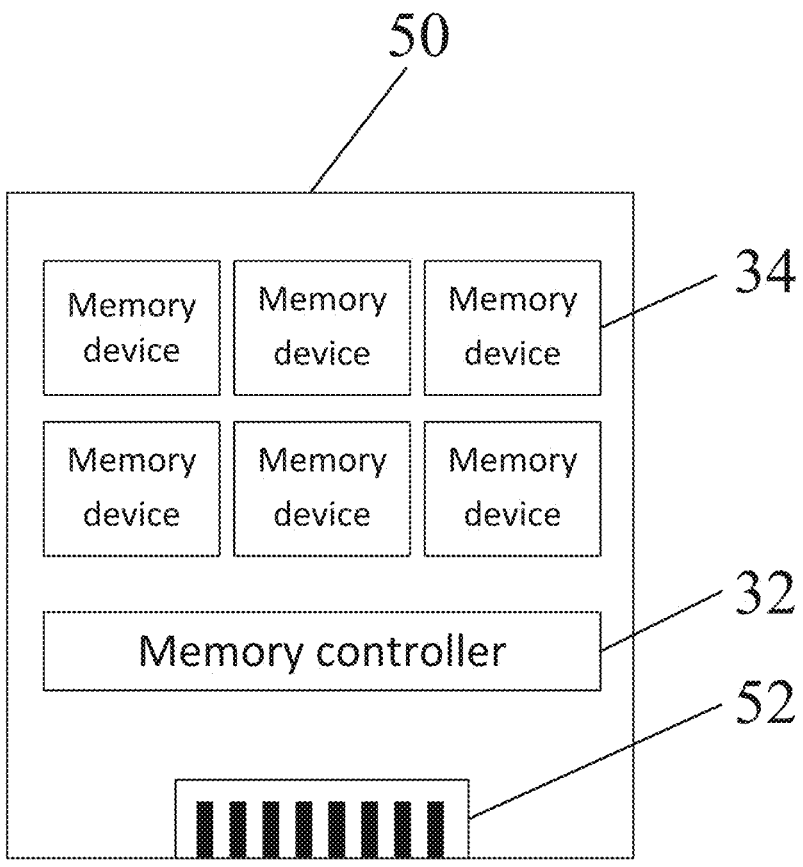
FIG. 1C is a schematic structural diagram of a solid state drive provided by examples of the present disclosure.

In an example of the present disclosure, the memory controller 32 and the one or more memory devices 34 may be integrated into various types of memory apparatuses, e.g., be included in the same package (such as a Universal Flash Storage (UFS) package or an eMMC package). That is, the memory system 30 may be implemented and packaged into different types of end electronic products. As shown in FIG. 1B, the memory controller 32 and the single memory device 34 may be integrated together to form a memory card 40. The memory card 40 may comprise a Personal Computer Memory Card International Association (PC) card, a CF card, a Smart Media (SM) card, a memory stick, a Multi-Media Card (MMC, Reduced-Size MMC (RS-MMC), MMC micro), an SD card (SD, miniSD, microSD, Secure Digital High Capacity (SDHC)), and UFS, etc. The memory card 40 may further comprise a memory card connector 42 coupling the memory card 40 with a host (e.g., the host 20 in FIG. 1A). In another example shown in FIG. 1C, the memory controller 32 and the plurality of memory devices 34 may be integrated together to form an SSD 50. The SSD 50 may further comprise an SSD connector 52 coupling the SSD 50 with the host (e.g., the host 20 in FIG. 1A). In some implementations, at least one of a storage capacity and/or an operation speed of the SSD 50 is greater than that of the memory card 40.

Figure 1D:
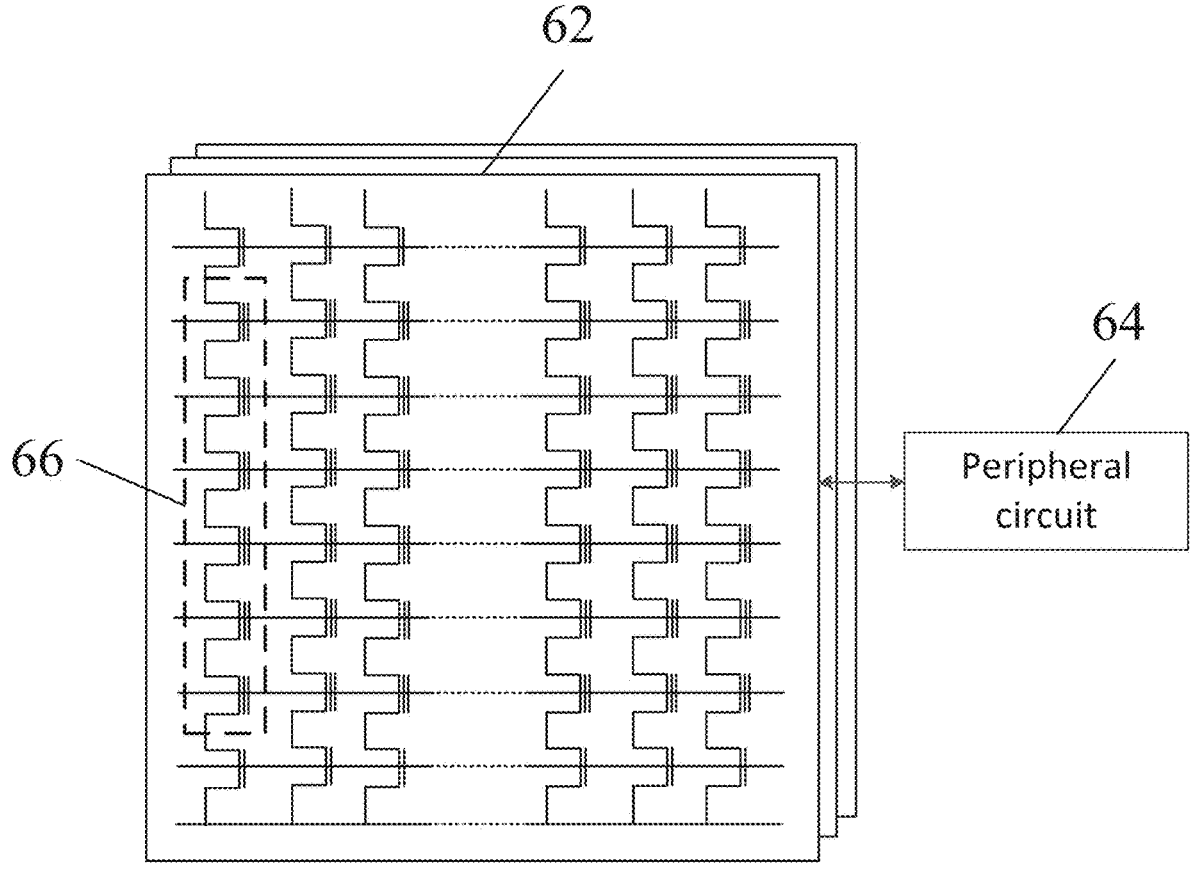
FIG. 1D and FIG. 1E are schematic structural diagrams of a memory device comprising a memory array and a peripheral circuit provided by examples of the present disclosure.

It is to be noted that the memory involved in an example of the present disclosure may be a semiconductor memory, which is a solid state electronic device that stores data information and is manufactured by a semiconductor integrated circuit process. In an example, FIG. 1D is a schematic diagram of an optional memory device 34 in examples of the present disclosure. As shown in FIG. 1D, the memory device 34 may comprise a memory array 62 and a peripheral circuit 64 coupled to the memory array 62, etc. Here, the memory array may be a NAND flash memory array in which memory cells are disposed in a form of an array of NAND memory strings 66, with each NAND memory string 66 extending vertically above a substrate. In some examples, each NAND memory string 66 may comprise a plurality of memory cells coupled in series and stacked vertically. Each memory cell may maintain a continuous analog value, such as voltage or charge, which depends on the number of electrons trapped within a memory cell region. Furthermore, the memory cell in the memory array 62 may be either a floating gate type memory cell that comprises a floating gate transistor, or a charge trap type memory cell that comprises a charge trap transistor.

In an example of the present disclosure, the memory cell may be a Single Level Cell (SLC) that has two possible memory states and thus may store one bit of data. For example, a first memory state "0" may correspond to a first threshold voltage range, and a second memory state "1" may correspond to a second threshold voltage range. In some other examples, each memory cell may be a Multi Level Cell (MLC) that can store more than one bit of data. For example, the MLC may store two bits per cell. Each memory cell may further be a Triple Level Cell (TLC), or each memory cell may further be a Quad Level Cell (QLC). Each MLC can be programmed to a range of possible nominal memory values. In an example, if each MLC stores two bits of data, the MLC may be programmed such that the memory cell is programmed from an erase state to one of three possible program states by writing one of three possible nominal memory values to the memory cell. A fourth nominal memory value may be used to correspond to the erase state.

Figure 1E:
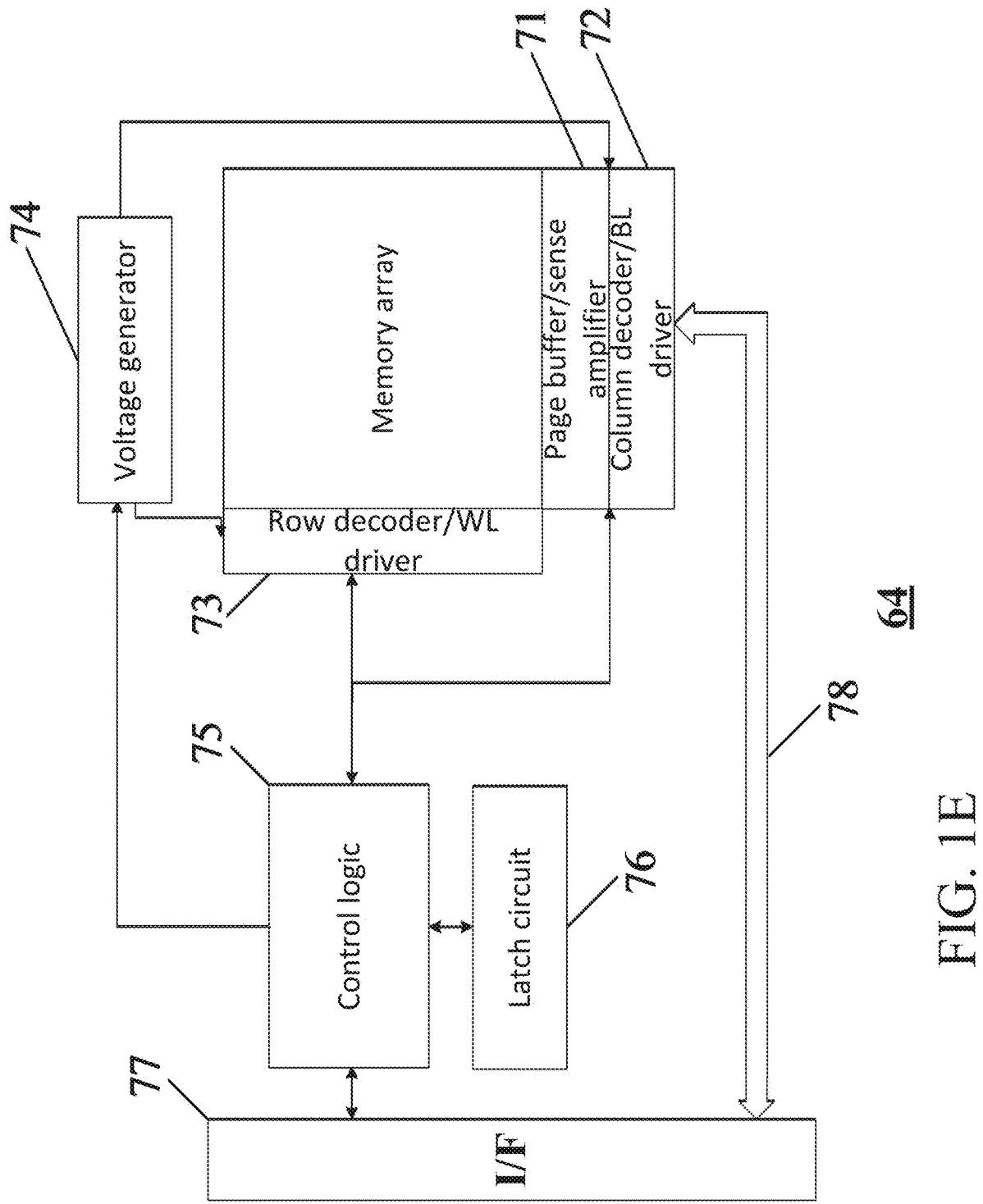

In examples of the present disclosure, the peripheral circuit 64 may be coupled to the memory array through a bit line (BL), a word line (WL), a source line, a source select gate (SSG), and a drain select gate (DSG). Here, the peripheral circuit 64 may comprise any suitable analog, digital, and hybrid signal circuits for promoting related operations of the memory array by applying and sensing a voltage signal and/or a current signal to and from each target memory cell via the bit line, the word line, the source line, the SSG, or the DSG, etc. Furthermore, the peripheral circuit 64 may further comprise various types of peripheral circuits formed using a Metal-Oxide-Semiconductor (MOS) technology. In an example, as shown in FIG. 1E, the peripheral circuit 64 may comprise a Page Buffer (PB)/sense amplifier 71, a column decoder/bit line driver 72, a row decoder/word line driver 73, a voltage generator 74, a control logic 75, a latch circuit 76, an interface 77, and a data bus 78. In some other examples, the peripheral circuit 64 may further comprise additional peripheral circuits not shown in FIG. 1E.

A memory system having a Zone Namespace (ZNS) function exposes an underlying logic thereof to a host, so that the host can perform data placement and garbage collection with higher efficiencies, thereby bringing many advantages to the entire memory system.

Figure 2:
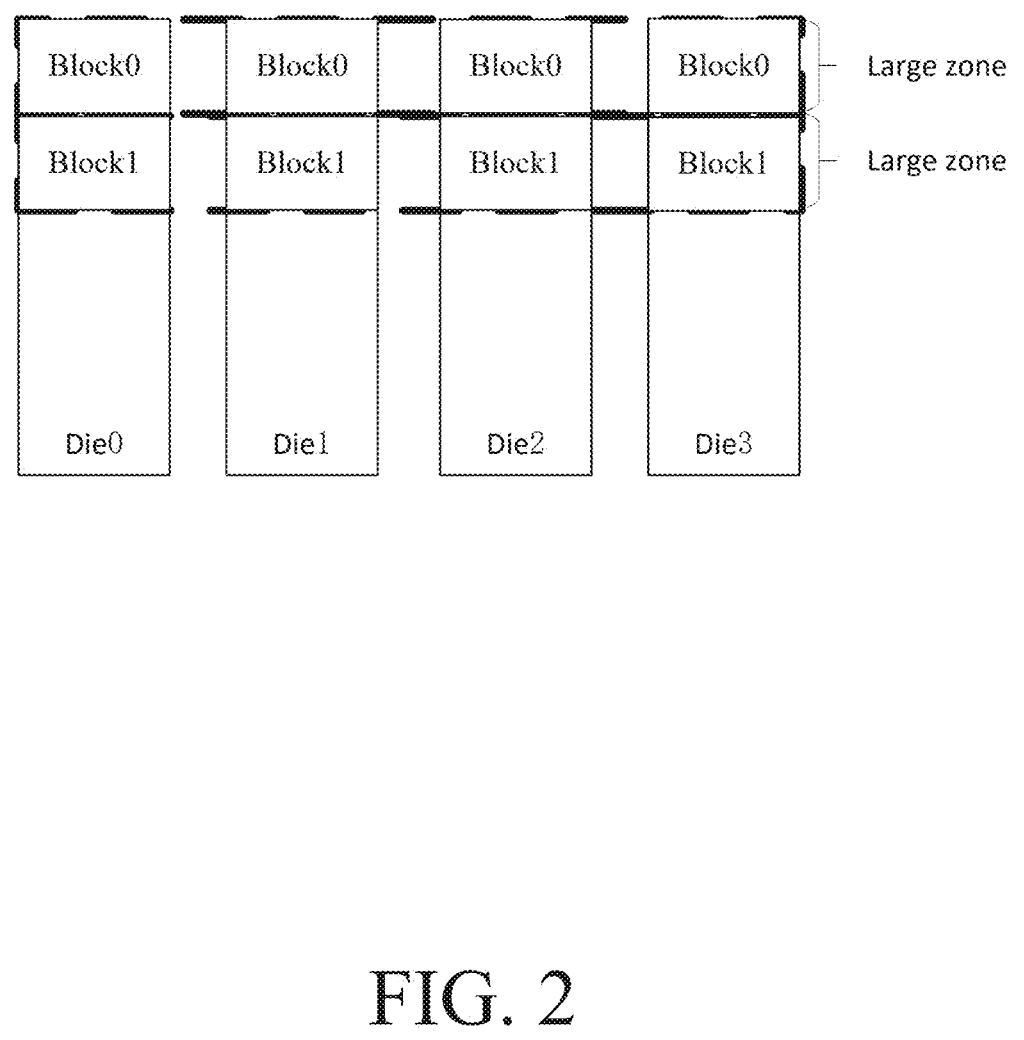

In some examples, the memory system having the ZNS function may use a large-zone configuration pattern, wherein a large zone here refers to a zone corresponding to a virtual block (VB). FIG. 2 is a schematic diagram of the large-zone configuration pattern used by the memory system. As shown in FIG. 2, each die comprises a plurality of blocks. The plurality of blocks are numbered in sequence, e.g., numbered from 0. A plurality of blocks at the same location (i.e., with the same number) in different dies constitute a virtual block. For example, Block0 of a die 0, Block0 of a die 1, Block0 of a die 2, and Block0 of a die 3 constitute one large zone. In other words, each large zone spans four dies. It may be understood that the four dies in FIG. 2 are examples only, and in some examples, each large zone may span 16-128 dies. The number of dies in the memory system is not limited in the examples of the present disclosure.

In the above example, a degree of IO parallelism can be increased using the large-zone configuration pattern, which, however, has a disadvantage of an excessive Garbage Collection (GC) overhead. An actual application scenario for a user includes a multi-read scenario of a recommender system, in which the excessive garbage collection overhead reduces read and write performance.

Figure 3:
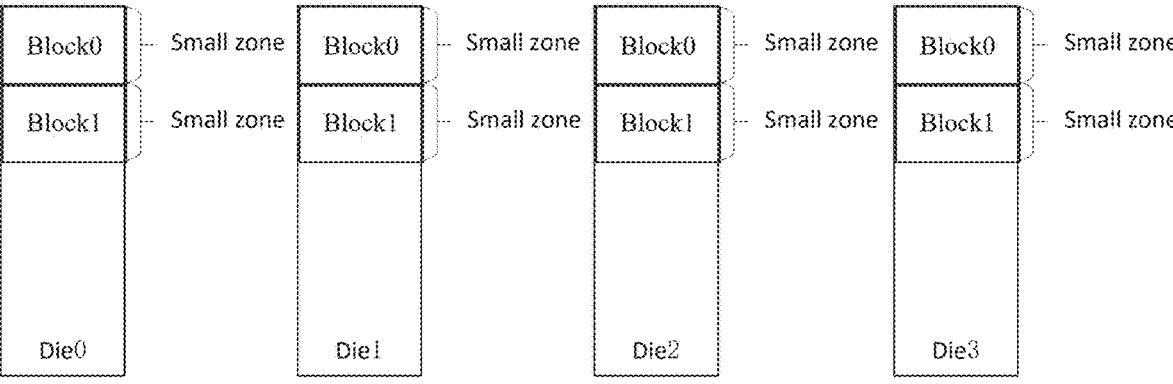
FIG. 3 is a schematic diagram of a small-zone configuration pattern used by the memory system.

In some examples, the memory system having the ZNS function may use a small-zone configuration pattern, wherein a small zone here refers to a zone corresponding to a block. FIG. 3 is a schematic diagram of the small-zone configuration pattern used by the memory system. As shown in FIG. 3, each die comprises a plurality of blocks. The plurality of blocks are numbered in sequence, e.g., numbered from 0. Each block in one die constitutes one small zone. For example, the Block0 of the die 0 is one small zone, the Block0 of the die 1 is one small zone, the Block0 of the die 2 is one small zone, and the Block0 of the die 3 is one small zone. In other words, each small zone spans one die. When multiple pieces of write data are written to a disk, there is a probability that some dies are busy with a pile of tasks, and some dies are relatively idle, thereby affecting a write bandwidth.

In the above example, although using the small-zone configuration pattern can solve the problem of the excessive garbage collection overhead, however, doing so may reduce the degree of IO parallelism.

The large-zone configuration pattern and the small-zone configuration pattern each have advantages and disadvantages, and a choice between both solutions is a trade-off between the garbage collection overhead and the degree of parallelism. The use of the large-zone configuration pattern leads to the excessive garbage collection overhead, affecting the read and write performance, and the use of the small-zone configuration pattern reduces the degree of parallelism, also affecting the performance.

In order to solve one or problems above, examples of the present disclosure provide a host, wherein the host is coupled with a memory system supporting a zone namespace function; the memory system comprises a memory device, and the memory device comprises K dies; the K dies are divided into N disturbance areas, each disturbance area comprises at least one die, and one block in each die in the disturbance area constitutes a zone jointly; K and N are positive integers greater than or equal to 2; the host is configured to: send a command to the memory system to perform a respective operation on zones corresponding to the command at the same time, wherein the zones corresponding to the command belong to different disturbance areas.

Figure 4:
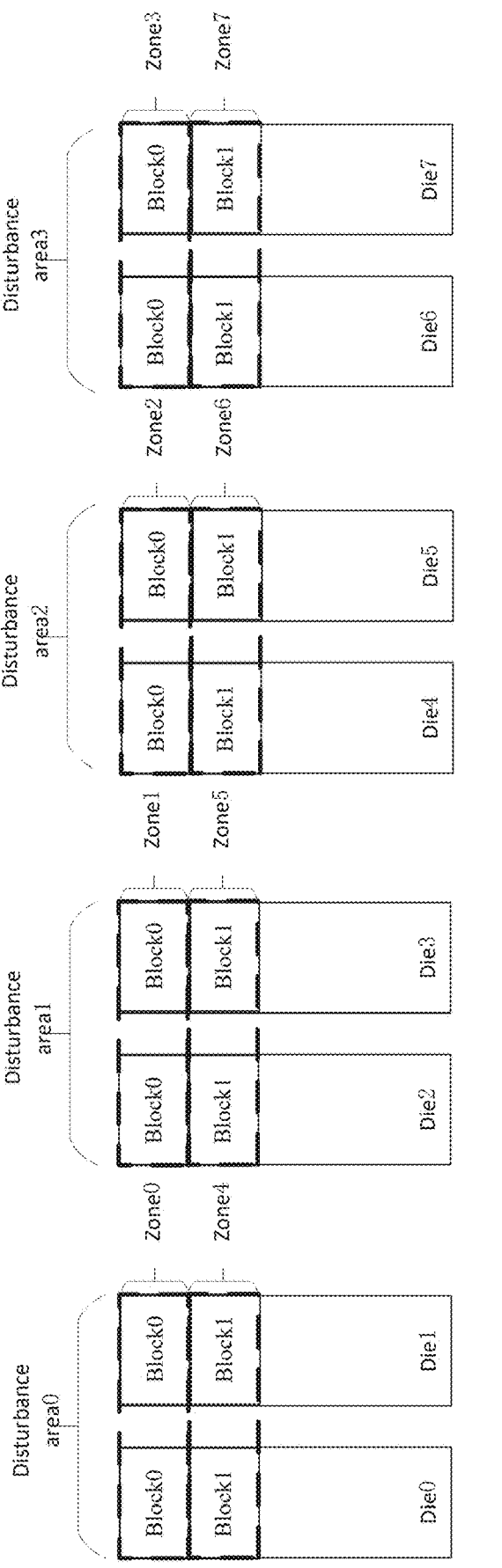
FIG. 4 is a schematic diagram I of a configuration pattern used by the memory system in examples of the present disclosure.

The examples of the present disclosure propose the concept of a Disturbance Area (DA), wherein different disturbance areas comprise at least one die and do not comprise all the dies. Whether a respective operation can be performed on different zones at the same time is determined based on whether different zones correspond to the same disturbance area. If zones corresponding to two IOs come from the same die group (one die group may comprise one or more dies, but cannot comprise all the dies), then the zones cannot be parallelized and may interfere with each other, and are regarded as coming from one disturbance area. If zones corresponding to two IOs do not come from the same die group (one die group may comprise a plurality of dies), then the zones can be parallelized and may not interfere with each other, and are regarded as coming from different disturbance areas. In FIG. 4, a zone 1 and a zone 5 come from a disturbance area 1, so two IOs corresponding to the zone 1 and the zone 5 interfere with each other. A zone 2 and a zone 6 come from a disturbance area 2, so two IOs corresponding to the zone 2 and the zone 6 interfere with each other. A zone 3 and a zone 7 come from a disturbance area 3, so two IOs corresponding to the zone 3 and the zone 7 interfere with each other. A zone 4 and a zone 8 come from a disturbance area 4, so two IOs corresponding to the zone 4 and the zone 8 interfere with each other.

As shown in FIG. 4, blocks at the same location (i.e., with the same number) in dies of the same disturbance area constitute a zone. That is, the Block0 in the die 0 and the Block0 in the die 1 constitute the zone 0, and the Block1 in the die 0 and the Block1 in the die 1 constitute the zone 4.

In some other examples, the Block0 in the die 0 and the Block1 in the die 1 may constitute one zone. The Block1 in the die 0 and the Block0 in the die 1 may constitute another zone. That is, one block in each die constitutes one zone jointly.

It is to be noted that, in the examples of the present disclosure, the K dies are divided into at least two disturbance areas. That is, one disturbance area do not comprise all the K dies, as the case where the disturbance area comprises all the dies is equivalent to the use of the large-zone configuration pattern, which leads to the same problem as that caused by the use of the large-zone configuration pattern.

In the examples of the present disclosure, the host sends the command to the memory system to perform the respective operation on the zones corresponding to the command at the same time. Since the zones corresponding to the command belong to different disturbance areas, the zones occupy a plurality of unrepeated dies, so that even if the respective operation is performed on the plurality of zones at the same time, a die busy does not occur while the degree of IO parallelism is increased. Moreover, since the size of each zone in the present disclosure is less than the size of one virtual block, the garbage collection overhead is reduced.

Figure 5:
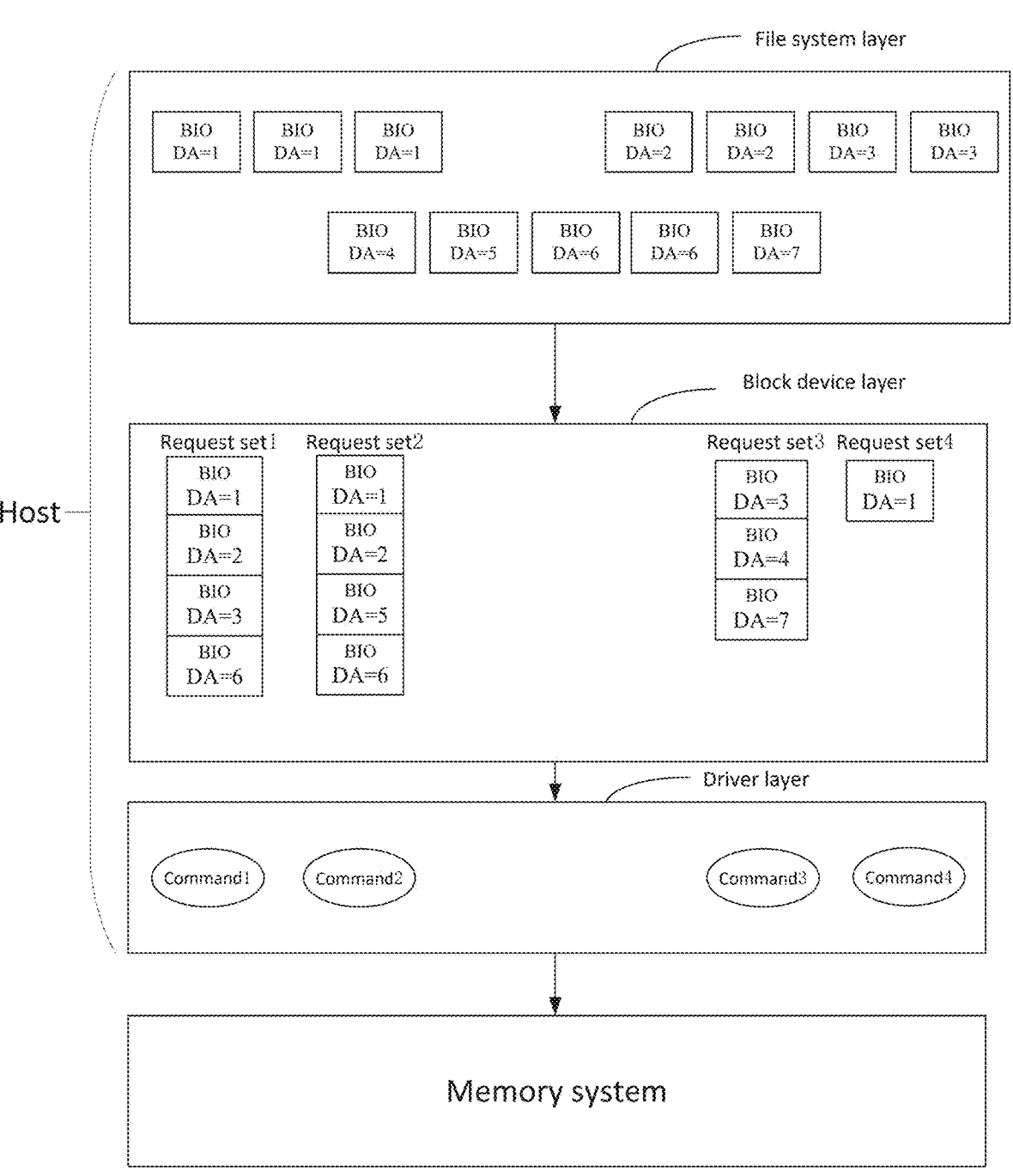
FIG. 5 is a schematic diagram of a process of constituting M request sets from a plurality of block input output requests in a host and outputting M commands provided by examples of the present disclosure.

In some examples, as shown in FIG. 5, the host is further configured to:

generate a plurality of block input output requests, and acquire capacity information of the zone and a maximum degree of parallelism of the memory system, wherein each block input output request carries logical address information;

acquire disturbance area information corresponding to the block input output request according to the capacity information of the zone, the maximum degree of parallelism, and the logical address information carried by the block input output request;

add the corresponding disturbance area information to the block input output request and output the block input output request;

divide the plurality of block input output requests into M request sets according to the disturbance area information contained by the block input output request, wherein the block input output requests in the same request set contain different disturbance area information, and M is a positive integer; and generate M commands conforming to an interface standard of the memory system, wherein each command corresponds to one of the request sets.

Input output devices may be divided into two categories: block devices and character devices. A block device stores information in blocks of a fixed size, with each block having its own address. The SSD is a common block device. A character device sends or receives byte streams without consideration of any block structure and is unable to be addressed. A mouse is a common character device.

In some examples, a file system layer of the host can receive a plurality of Input Output (IO) requests submitted by the user and generate a plurality of Block Input Output (Block IO, BIO) requests. BIO describes an IO operation of the block device. The BIO request contains not only entire information required by this IO operation, but also a state during an IO process, and a system can complete the designated IO operation based on the information in the BIO request.

The information contained in the BIO request includes, but is not limited to: logical address information, a command type (e.g., read or write), a data size, etc. The logical address information here may be a Logical Block Address (LBA) of a data block, which can refer to an address of a data block or a data block to which an address is directed.

The host is coupled with the memory system, and may acquire the capacity information of each zone in the memory system and the maximum degree of parallelism of the memory system through the memory system.

In some examples, all the zones may have the same capacity information. In some other examples, all the zones may have different capacity information.

In some examples, the maximum degree of parallelism of the memory system is equal to the number of disturbance areas. In some other examples, the maximum degree of parallelism of the memory system may be a preset value. In some implementations, the maximum degree of parallelism of the memory system may be related to characteristics of the memory system per se, such as a bandwidth, etc.

In some examples, firmware may provide the maximum degree of parallelism of the memory system to the host. In particular, the firmware may place such information in a vendor-specific log page, and the host may acquire the maximum degree of parallelism of the memory system by sending a get-log-page instruction to the memory system.

The disturbance area information corresponding to the block input output request may obtained according to the capacity information of the zone, the maximum degree of parallelism, and the logical address information carried by the block input output request.

In the examples of the present disclosure, the computed disturbance area information may be added to the BIO request, so that each BIO request may contain the disturbance area information. The file system layer of the host outputs, to a block device layer of the host, the BIO request carrying the disturbance area information.

The block device layer receives a plurality of BIO requests, and an IO scheduler in the block device layer merges the plurality of BIO requests into at least one Request set. In the examples of the present disclosure, when merging the BIO requests, the IO scheduler avoids merging BIO requests that come from different zones but belong to the same disturbance area into the same request set, so as to improve the degree of parallelism and avoid performance degradation caused by the die busy. As shown in FIG. 5, there are four request sets, and the BIO requests contained in each request set correspond to different disturbance area information. For example, a request set 1 comprises four BIO requests corresponding to the disturbance area 1, the disturbance area 2, the disturbance area 3, and the disturbance area 6 respectively. The above four disturbance area information are different from each other.

The block device layer outputs a plurality of request sets to a driver layer, and one request set may be correspondingly packaged in the driver layer into a corresponding command that conforms to an interface protocol of the memory system. After the packaging is complete, the driver layer outputs a plurality of commands to the memory system.

The host may be coupled with various types of memory systems. Interface protocols of different memory systems are different. The interface protocol includes, but is not limited to, a USB protocol, an MMC protocol, a Peripheral Component Interconnect (PCI) protocol, a Peripheral Component Interconnect Express (PCI-E) protocol, an Advanced Technology Attachment (ATA) protocol, a serial ATA protocol, a parallel ATA protocol, a Small Computer System Interface (SCSI) protocol, an Enhanced Small Disk Interface (ESDI) protocol, an Integrated Development Equipment (IDE) protocol, and a Firewire protocol, etc. By packaging each request set into one corresponding command conforming to the interface protocol of the memory system, the corresponding memory system can receive the command properly and execute the command.

The memory system receives the command so that the respective operation can be performed on the zones corresponding to the command at the same time, wherein the zones corresponding to the command belong to different disturbance areas.

In the examples of the present disclosure, the BIO may be performed based on the IO scheduler in the block device layer in a kernel mode. Since the IO scheduler is present in the block device layer per se, the examples of the present disclosure make few changes to the host. Just by improving a function of the IO scheduler so that it is capable of grouping the block input output requests based on the disturbance area information, whereby the block input output requests in the same request set contain different disturbance area information, the function required by the examples of the present disclosure can be implemented.

In some examples, the host is configured to:

acquire the zone corresponding to the block input output request according to the capacity information of the zone and the logical address information carried by the block input output request; and acquire the disturbance area information corresponding to the block input output request according to the zone corresponding to the block input output request and the maximum degree of parallelism.

The examples of the present disclosure provide an example illustration in which all the zones have the same capacity information, a capacity of each zone is 300 M, and the maximum degree of parallelism of the memory system is 4.

It is assumed that logical address information carried by a first input output request is 500 M, and logical address information carried by a second input output request is 1600 M. For the first input output request, a zone number thereof is [500 M/300 M]=1, wherein [ ] is a rounding symbol, and corresponding disturbance area information is 1 (1/4=0, with a remainder 1, wherein the disturbance area information is determined by the remainder), so it belongs to the disturbance area 1. For the second input output request, a zone number thereof is [1600 M/300 M]=5, and corresponding disturbance area information is 1 (5/4=0, with a remainder 1), so it also belongs to the disturbance area 1.

In some examples, the plurality of block input output requests constitute at least one request group, wherein the block input output requests in the same request group carry the same disturbance area information; and M is equal to the number of block input output requests in a request group with a maximum number of block input output requests in at least one request group.

Figure 6:
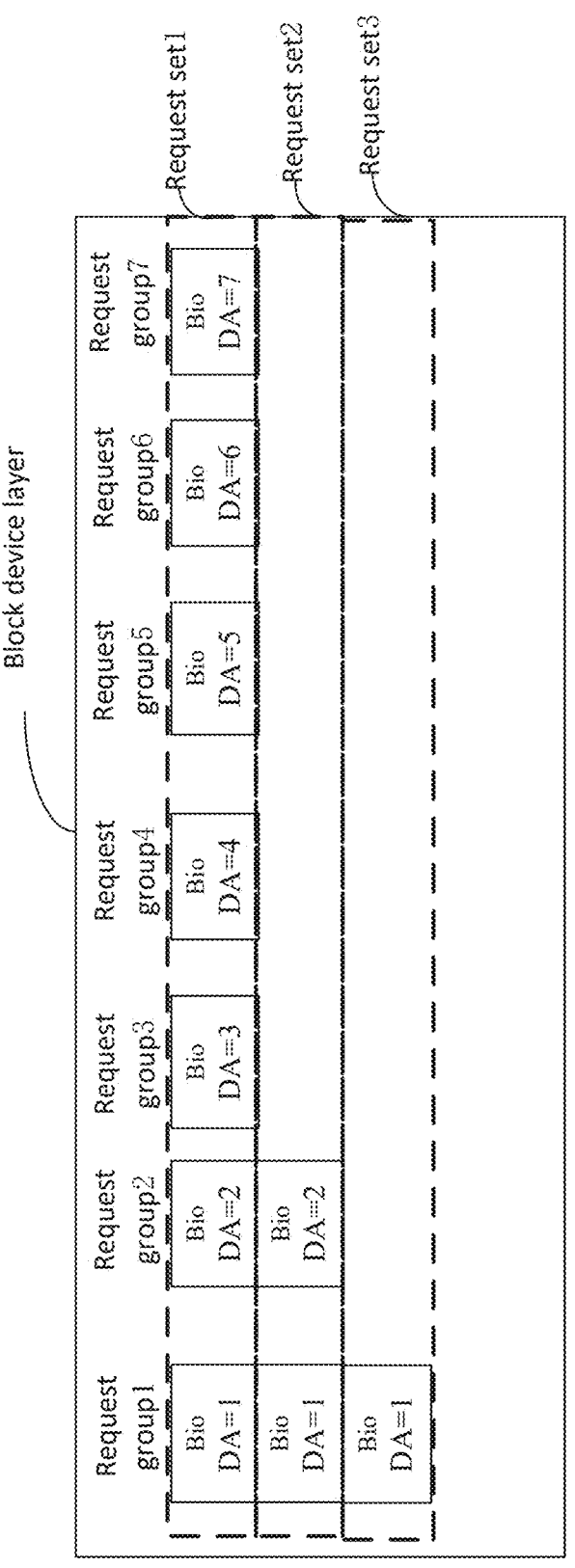
FIG. 6 is a schematic diagram of a process of constituting at least one request group from a plurality of block input output requests in a block device layer of the host in examples of the present disclosure.

In some examples, the plurality of block input output requests may constitute at least one request group in the block device layer. As shown in FIG. 5 and FIG. 6, the plurality of BIO requests in the file system layer of FIG. 5 are divided into seven request groups in the block device layer of FIG. 6, and the BIO requests in the same request group carry the same disturbance area information. For example, each disturbance area information carried by the BIO requests in a request group 1 is DA=1.

In some examples, the number M of the request sets may be determined by the number of block input output requests in the request group with the maximum number of block input output requests in at least one request group. As shown in FIG. 6, the request group 1 contains the maximum number of BIO requests, which is 3, and accordingly, the number of the request sets may be equal to 3 or greater than 3.

In some examples, the host is further configured to:

perform a first operation repeatedly M times to obtain the M request sets, wherein the first operation comprises selecting one block input output request from each request group to constitute one request set, and the same block input output request is contained in only one request set.

The above example is described below by using FIG. 6 as an example.

In FIG. 6, the request group 1 comprises three BIO requests with DA=1, a request group 2 comprises two BIO requests with DA=2, a request group 3 comprises one BIO request with DA=3, a request group 4 comprises one BIO request with DA=4, a request group 5 comprises one BIO request with DA=5, a request group 6 comprises one BIO request with DA=6, and a request group 7 comprises one BIO request with DA=7.

In some examples, one BIO request may be selected from each request group and placed in one request set, until the number of BIO requests in the request group is 0. In this example, the request set 1=(DA=1, DA=2, DA=3, DA=4, DA=5, DA=6, DA=7), a request set 2=(DA=1, DA=2, DA=3, DA=6), and a request set 3=(DA=1).

In the above example, a situation where the number of constituted request sets is minimum and the degree of IO parallelism contained in a single request set is maximum can be realized, such that time for processing the plurality of BIO requests can be saved effectively, thereby improving the processing efficiency.

In some examples, an absolute value of a difference between numbers of write requests contained in any two of the plurality of request sets is less than or equal to a preset value.

In some examples, the plurality of BIO requests may be grouped as evenly as possible, such that the absolute value of the difference between the numbers of the BIO requests contained in any two of the M request sets is less than or equal to the preset value. For example, the preset value may be 1. 12 BIO requests shown in FIG. 6 are grouped evenly, and in some examples, may be grouped into three groups, i.e., the request set 1=(DA=1, DA=2, DA=3, DA=6), the request set 2=(DA=1, DA=2, DA=5, DA=6), and the request set 3=(DA=1, DA=3, DA=4, DA=7). In this example, a situation where the number of the constituted request sets is minimum while the processing of each request set each time occupies like resources may be realized, such that a situation of lagging caused by insufficient memory due to excessive write requests contained in one request set is avoided.

In some other examples, the preset value may further be another numerical value, and may be set according to actual application requirements. The present disclosure is not limited thereto.

In some examples, the host is further configured to: send the command to the memory system to perform a read write operation on the zones corresponding to the request set corresponding to the command at the same time.

In the examples of the present disclosure, the commands may include a read command, a write command, and a read write hybrid command, etc.

In some examples, the host is configured to:

acquire disturbance areas to which a plurality of zones belong respectively;

select some zones from the plurality of zones as target zones, wherein the plurality of target zones belong to different disturbance areas respectively; and send the command of writing to-be-written data to the plurality of target zones to the memory system, so as to perform a write operation on the plurality of target zones corresponding to the command at the same time.

In some examples, as shown in FIG. 4, each zone has corresponding disturbance area information. The host is coupled with the memory system, and may acquire the disturbance area information of each zone through the memory system, so as to determine a disturbance area to which each zone belongs. For example, the memory system notifies the host that disturbance area information of the zone 0 is 0, and disturbance area information of the zone 1 is 1, etc.

Some zones are selected from the plurality of zones as the target zones, and the target zones belong to different disturbance areas. This is because, when the target zones belong to different disturbance areas, performing the write operation on these target zones at the same time does not cause the die busy while increasing the degree of IO parallelism. Moreover, since the actual size of each zone is less than the size of one virtual block, the garbage collection overhead is reduced.

The host sends the command to the memory system, wherein the command is required to meet the interface protocol of the connected memory system, such that the memory system is able to receive the command properly and execute the command. Moreover, the command allows performing the write operation on the plurality of target zones at the same time.

In some examples, the host is configured to: acquire a start logical block address of each zone of the memory system, the maximum degree of parallelism of the memory system, and the capacity information of the zone; and acquire the disturbance areas to which the plurality of zones belong respectively according to the start logical block address of each zone of the memory system, the maximum degree of parallelism of the memory system, and the capacity information of the zone.

In the examples of the present disclosure, the host may acquire the start logical block address (SLBA) of each zone of the memory system from the memory system coupled therewith that having the ZNS function. For example, the host may send a query instruction to the memory system to acquire the start logical block address of each zone of the memory system.

The examples of the present disclosure provide an example illustration in which each zone has the same capacity information, a capacity of each zone is 300 M, and the maximum degree of parallelism of the memory system is 4. It is assumed that a start logical block address of a first zone is 300 M, and a start logical block address of a second zone is 1500 M. For the first zone, a zone number thereof is [300 M/300 M]=1, wherein [ ] is a rounding symbol, and corresponding disturbance area information is 1 (1/4=0, with a remainder 1, wherein the disturbance area information is determined by the remainder), so it belongs to the disturbance area 1. For the second zone, a zone number thereof is [1500 M/300 M]=5, and corresponding disturbance area information is 1 (5/4=0, with a remainder 1), so it also belongs to the disturbance area 1.

In the examples of the present disclosure, the disturbance areas to which the plurality of zones belong respectively may be computed according to the start logical block address of each zone of the memory system, the maximum degree of parallelism of the memory system, and the capacity information of the zone, so that the target zones may be selected based the disturbance areas corresponding to the zones. By avoiding selecting zones with the same disturbance area information as the target zones, the write operation may be performed on the plurality of zones at the same time, without causing the problem such as the die busy, etc.

In some examples, the host is configured to:
    determine the number of the required target zones according to hotness and a data type of the to-be-written data.

For example, a Flash Friendly File System (F2FS) comprises two types of blocks: NODE (node) type blocks and DATA (data) type blocks, wherein the NODE type blocks are used to store index data of files and the DATA type blocks store actual data of the files. Therefore, the type of the to-be-written data includes a NODE type and a DATA type, which are required to be written into respective types of blocks respectively.

Data can be categorized into three types according to hotness, including hot data, warm data, and cold data. In some examples, a data temperature may be related to a use frequency of the data, and in some other examples, the data temperature may be user-defined based on the data type. For example, a data block of one directory may be fixedly defined as hot data. In other examples, the data temperature may also be defined based on other data characteristics.

Figure 7:
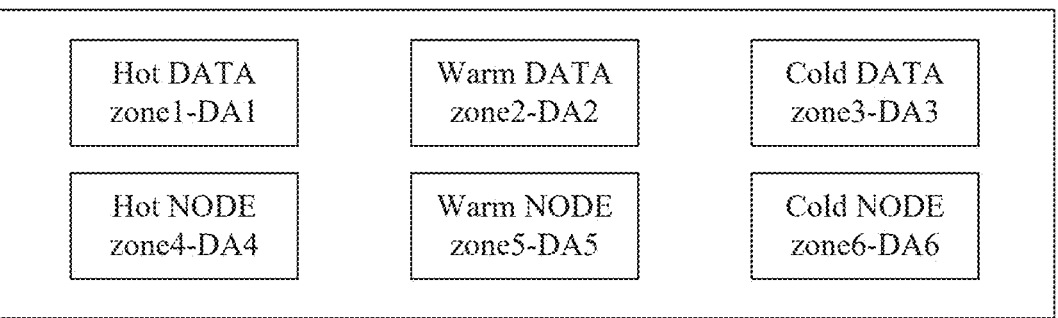
FIG. 7 is a schematic diagram I of selecting target zones in examples of the present disclosure.

Therefore, the above flash friendly file system, as shown in FIG. 7, comprises six types of data, which are hot DATA, warm DATA, cold DATA, hot NODE, warm NODE, and cold NODE respectively. The six types of data correspond to six different zones, so the number of the required target zones is 6.

It is to be understood that the above flash friendly file system comprising the six types of data is merely an example, and in some examples, the flash friendly file system may comprise only one, or two, or even more than three types of hotness of the data. The flash friendly file system may also comprise one or more than two data types of the data. The present disclosure is not limited thereto.

Furthermore, the present disclosure is applicable to other file systems, not limited to various other flash file systems, and hard disk file systems, etc.

In the examples of the present disclosure, the number of the required target zones is determined to be six according to the hotness and the data type of the data of the F2FS, and the six zones may be the zone 1 (DA=1), the zone 2 (DA=2), the zone 3 (DA=3), the zone 4 (DA=4), the zone 5 (DA=5), and the zone 6 (DA=6). It is to be understood that the selection of the six target zones in the above example is merely an example, and it is only required in practice that the six target zones correspond to different disturbance areas.

In some examples, the host is configured to: determine the number of the required target zones according to the number of applications from which the to-be-written data comes.

In some examples, if there are six different applications (APPs) sending requests, it is required to write data from the different APPs to different zones, and accordingly, it is required to open target zones of six different disturbance areas, so as to perform an operation on the six different APPs at the same time. Therefore, the number of the required target zones is 6. The six zones may be the zone 1 (DA=1), the zone 2 (DA=2), the zone 3 (DA=3), the zone 4 (DA=4), the zone 5 (DA=5), and the zone 6 (DA=6). It is to be understood that the number of APPs and the selection of the six target zones in the above example is merely an example, and it is only required in practice that the six target zones correspond to different disturbance areas.

In some examples, the host is configured to: reselect a new zone from the plurality of zones as a new target zone when one of the plurality of target zones is fully written, wherein the new target zone belongs to a disturbance area different from a disturbance area to which a not fully written target zone in the plurality of target zones belongs.

Figure 8:
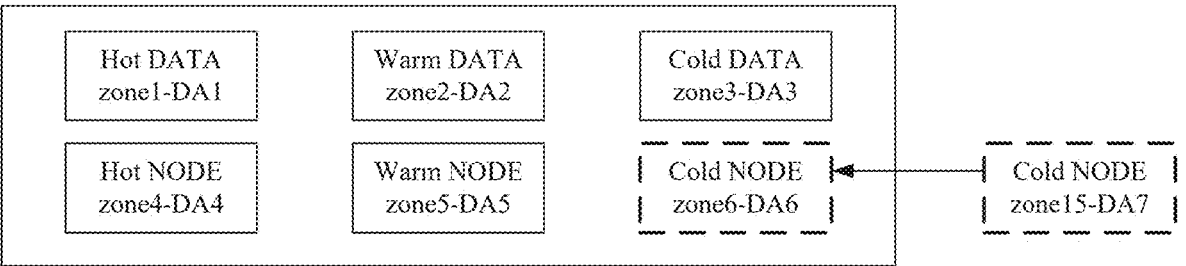
FIG. 8 is a schematic diagram II of selecting target zones in examples of the present disclosure.
Figure 9:
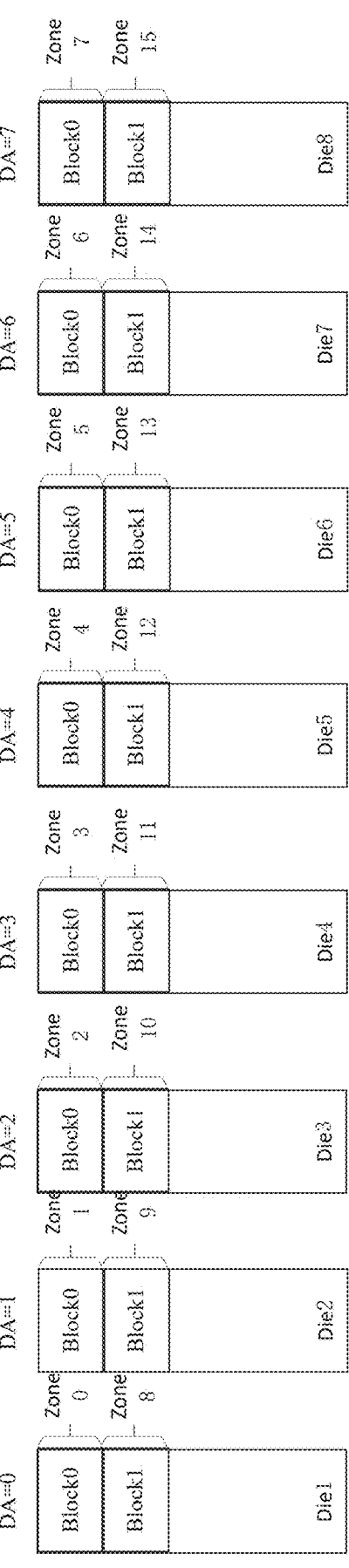
FIG. 9 is a schematic diagram II of a configuration pattern used by the memory system in examples of the present disclosure.

Combining FIG. 8 and FIG. 9, if the zone 6 is fully written, it is required to open a new target zone by reselecting a new zone from the plurality of zones as the new target zone (e.g., the zone 15 (DA=7)), wherein the new target zone belongs to a disturbance area different from a disturbance area to which a not fully written target zone in the plurality of target zones belongs. As such, the problem of the die busy may not be caused.

Examples of the present disclosure further provide an operation method of a host, wherein the host is coupled with a memory system supporting a zone namespace function; the memory system comprises a memory device, and the memory device comprises K dies; the K dies are divided into N disturbance areas, each disturbance area comprises at least one die, and one block in each die in the disturbance area constitutes a zone jointly; K and N are positive integers greater than or equal to 2; as shown in FIG. 10, the method comprises:
    S1, sending a command to the memory system to perform a respective operation on zones corresponding to the command at the same time, wherein the zones corresponding to the command belong to different disturbance areas.

In the examples of the present disclosure, the host sends the command to the memory system to perform the respective operation on the zones corresponding to the command at the same time. Since the zones corresponding to the command belong to different disturbance areas, the zones occupy a plurality of unrepeated dies, so that even if the respective operation is performed on the plurality of zones at the same time, a die busy does not occur while the degree of IO parallelism is increased. Moreover, since the size of each zone in the present disclosure is less than the size of one virtual block, the garbage collection overhead is reduced.

In some examples, the method further comprises:
    generating a plurality of block input output requests, and acquiring capacity information of the zone and a maximum degree of parallelism of the memory system, wherein each block input output request carries logical address information;
    acquiring disturbance area information corresponding to the block input output request according to the capacity information of the zone, the maximum degree of parallelism, and the logical address information carried by the block input output request;

adding the corresponding disturbance area information to the block input output request and output the block input output request;

dividing the plurality of block input output requests into M request sets according to the disturbance area information contained by the block input output request, wherein the block input output requests in the same request set contain different disturbance area information, and M is a positive integer; and generating M commands conforming to an interface standard of the memory system, wherein each command corresponds to one of the request sets.

In some examples, the dividing the plurality of block input output requests into M request sets according to the disturbance area information contained by the block input output request comprises:

dividing the plurality of block input output requests into at least one request group, wherein the block input output requests in the same request group carry the same disturbance area information; and M is equal to the number of block input output requests in a request group with a maximum number of block input output requests in at least one request group.

In some examples, the dividing the plurality of block input output requests into M request sets according to the disturbance area information contained by the block input output request further comprises:

performing a first operation repeatedly M times to obtain the M request sets, wherein the first operation comprises selecting one block input output request from each request group to constitute one request set, and the same block input output request is contained in only one request set.

In some examples, the acquiring disturbance area information corresponding to the block input output request according to the capacity information of the zone, the maximum degree of parallelism, and the logical address information carried by the block input output request comprises:

acquiring the zone corresponding to the block input output request according to the capacity information of the zone and the logical address information carried by the block input output request; and acquiring the disturbance area information corresponding to the block input output request according to the zone corresponding to the block input output request and the maximum degree of parallelism.

In some examples, the sending a command to the memory system to perform a respective operation on zones corresponding to the command at the same time comprises:

sending the command to the memory system to perform a read write operation on the zones corresponding to the request set corresponding to the command at the same time.

In some examples, the method further comprises:

acquiring disturbance areas to which a plurality of zones belong respectively; and selecting some zones from the plurality of zones as target zones, wherein the plurality of target zones belong to different disturbance areas respectively;

the sending a command to the memory system to perform a respective operation on zones corresponding to the command at the same time comprises:

sending the command of writing to-be-written data to the plurality of target zones to the memory system, so as to perform a write operation on the plurality of target zones at the same time.

In some examples, the acquiring disturbance areas to which a plurality of zones belong respectively comprises:

acquiring a start logical address of each zone of the memory system, the maximum degree of parallelism of the memory system, and the capacity information of the zone; and acquiring the disturbance areas to which the plurality of zones belong respectively according to the start logical address of each zone of the memory system, the maximum degree of parallelism of the memory system, and the capacity information of the zone.

In some examples, the method further comprises:

determining the number of the required target zones according to hotness and a data type of the to-be-written data.

In some examples, the method further comprises:

determining the number of the required target zones according to the type of applications from which the to-be-written data comes.

In some examples, the method further comprises:

reselecting a new zone from the plurality of zones as a new target zone when one of the plurality of target zones is fully written, wherein the new target zone belongs to a disturbance area different from a disturbance area to which a not fully written target zone in the plurality of target zones belongs.

An example implementation of the method in the above example is described in detail in examples of a product corresponding to the method, and is no longer set forth in detail here.

In some examples, the memory controller comprises a hardware queue, which receives M read write commands and outputs every N read write commands as a command group. M and N are both integers, and M is greater than N. A first command group comprises the first read write command to the N-th read write command among the M read write commands, and a second command group comprises the (N+1)-th read write command to the 2N-th read write command among the M read write commands, etc. In this example, N read write commands are selected sequentially from the M read write commands in a first-in first-out order and output as a command group.

In the above example, if at least two of the disturbance areas corresponding to the N read write commands in a command group are the same, at least some dies are caused to be busy, failing to perform a read write operation on the N read write commands at the same time. Accordingly, performance degradation of the memory controller is caused.

In order to solve the above problem, examples of the present disclosure further provide a memory system, wherein the memory system comprises a memory device and a memory controller coupled with the memory device and supports a zone namespace function; the memory device comprises K dies; the K dies are divided into N disturbance areas, each disturbance area comprises at least one die, and one block in each die in the disturbance area constitutes a zone jointly; K and N are positive integers greater than or equal to 2; the memory controller is configured to:

receive a first command queue, wherein the first command queue comprises a plurality of read write commands;

acquire capacity information of the zone, a maximum degree of parallelism of the memory system, and logical address information carried by each read write command;

acquire disturbance area information corresponding to the read write command according to the capacity information of the zone, the maximum degree of parallelism, and the logical address information carried by the read write command; and divide the plurality of read write commands into M command sets according to the disturbance area information contained by the read write command, wherein the read write commands in the same command set contain different disturbance area information, and M is a positive integer.

In the examples of the present disclosure, a first hardware queue of the memory controller receives the first command queue, wherein the first command queue comprises a plurality of read write commands.

Here, the plurality of read write commands may be a plurality of read commands, a plurality of write commands, and a plurality of read write hybrid commands.

In some examples, the number of the plurality of read write commands in the first command queue may be equal to a preset number. In some examples, the preset number may be greater than or equal to the maximum degree of parallelism of the memory system. In some other examples, the preset number may be a positive integer greater than or equal to 2.

In some other examples, the number of the plurality of read write commands in the first command queue may be equal to the number of read write commands in present time.

A reschedule pool of the memory controller receives all the read write commands in the first command queue and reschedules them. The reschedule pool divides the plurality of read write commands into the M command sets according to the disturbance area information contained by the read write command. The read write commands in the same command set contain different disturbance area information.

The reschedule pool outputs the M command sets to a second hardware queue sequentially.

In some examples, the memory controller is further configured to: perform a read write operation on zones respectively corresponding to the plurality of read write commands in the same command set at the same time.

In the examples of the present disclosure, the disturbance area information corresponding to each read write command may be added to the first hardware queue, or the disturbance area information corresponding to each read write command may be added to the reschedule pool.

In the examples of the present disclosure, the capacity information of the zone, the maximum degree of parallelism of the memory system, and the logical address information carried by each read write command may be acquired. The disturbance area information corresponding to the read write command is acquired according to the capacity information of the zone, the maximum degree of parallelism, and the logical address information carried by the read write command.

The examples of the present disclosure provide an example illustration in which each zone has the same capacity information, a capacity of each zone is 300 M, and the maximum degree of parallelism of the memory system is 4.

It is assumed that logical address information carried by a first read write command is 500 M, and logical address information carried by a second read write command is 1600 M. For the first read write command, a zone number thereof is [500 M/300 M]=1, wherein [ ] is a rounding symbol, and corresponding disturbance area information is 1 (1/4=0, with a remainder 1, wherein the disturbance area information is determined by the remainder), so it belongs to the disturbance area 1. For the second read write command, a zone number thereof is [1600 M/300 M]=5, and corresponding disturbance area information is 1 (5/4=0, with a remainder 1), so it also belongs to the disturbance area 1.

In the examples of the present disclosure, the M command sets are obtained by rescheduling the plurality of received read write commands, and the read write operation is performed on the zones respectively corresponding to the plurality of read write commands in the same command set at the same time. Since the zones corresponding to the plurality of read write commands in the same command set belong to different disturbance areas, the zones occupy a plurality of unrepeated dies, so that even if the respective operation is performed on the plurality of zones at the same time, a die busy does not occur while the degree of IO parallelism is increased. Moreover, since the size of each zone in the present disclosure is less than the size of one virtual block, the garbage collection overhead is reduced.

In some examples, the memory controller is further configured to:

divide the plurality of read write commands into M command groups according to the disturbance area information contained by the read write command, wherein the read write commands in the same command group correspond to the same disturbance area information; and perform a second operation repeatedly M times to obtain the M command sets, wherein the second operation comprises selecting one read write command from each command group to constitute one command set, and the same read write command is contained in only one command set.

The above example is described below by using FIG. 11 as an example.

The first command queue may comprise eight commands, which are, for example, a command 1 (DA=0), a command 2 (DA=0), a command 3 (DA=1), a command 4 (DA=1), a command 5 (DA=2), a command 6 (DA=2), a command 7 (DA=3), and a command 8 (DA=1) respectively.

The commands with the same disturbance area information are placed into the same command group.

As such, a first command group comprises the command 1 (DA=0) and the command 2 (DA=0). A second command group comprises the command 3 (DA=1), the command 4 (DA=1), and the command 8 (DA=1). A third command group comprises the command 5 (DA=2) and the command 6 (DA=2). A fourth command group comprises the command 7 (DA=3).

In some examples, one command may be selected from each command group and placed into a command set, until the number of commands in the command group is 0. In this example, a command set 1=(the command 1 (DA=0), the command 3 (DA=1), the command 5 (DA=2), the command 7 (DA=3)), a command set 2=(the command 2 (DA=0), the command 4 (DA=1), the command 6 (DA=2)), and a command set 3=(the command 8 (DA=1)).

In the above example, a situation where the number of constituted command sets is minimum and the degree of IO parallelism contained in a single command set is maximum can be realized, such that time for processing the plurality of commands can be saved effectively, thereby improving the processing efficiency.

In some examples, an absolute value of a difference between numbers of write requests contained in any two of the plurality of command sets is less than or equal to a preset value.

In some examples, the plurality of commands may be grouped as evenly as possible, such that the absolute value of the difference between the numbers of the commands contained in any two of the plurality of command sets is less than or equal to the preset value. For example, the preset value may be 1.

Figure 11:
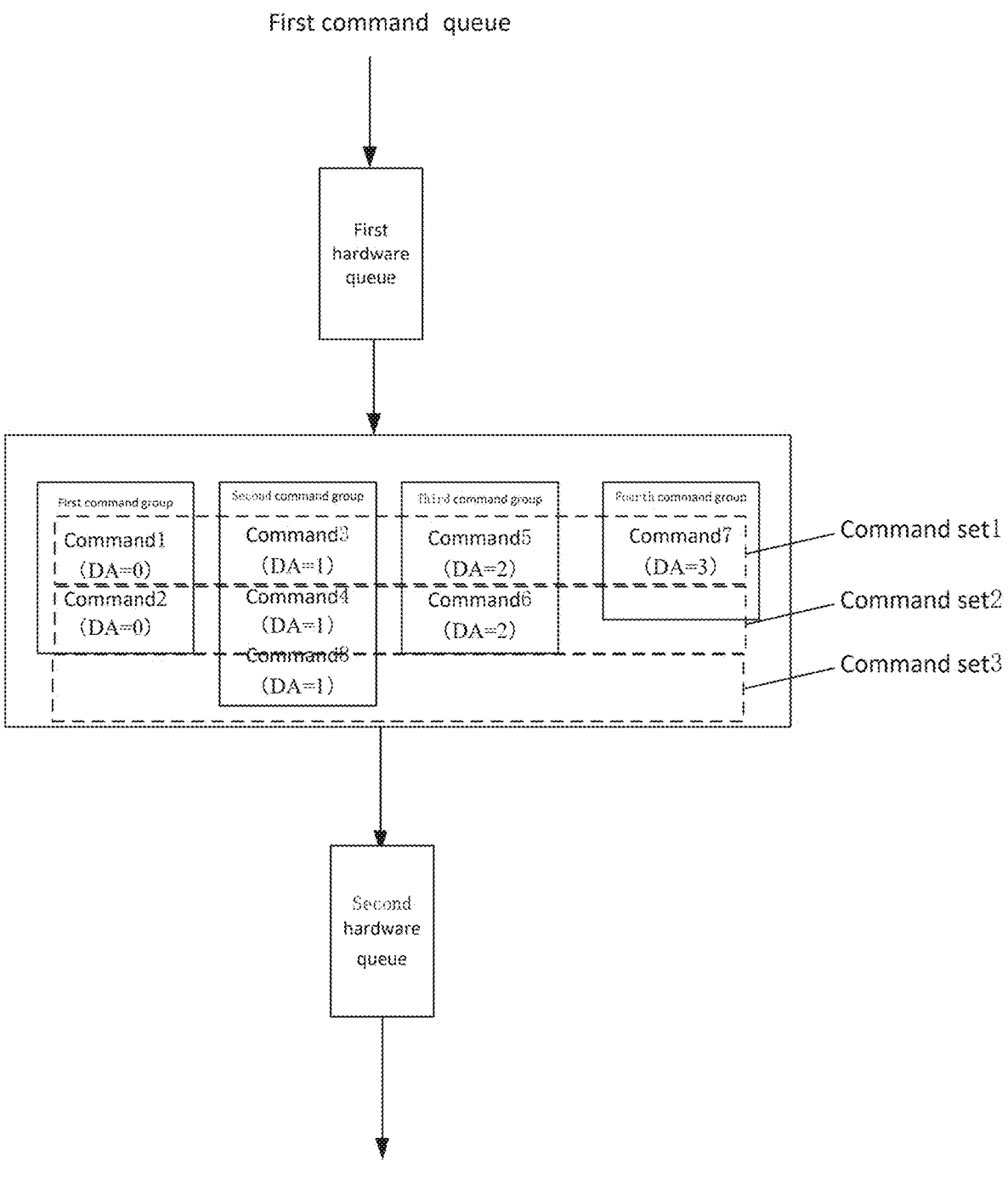
FIG. 11 is a schematic diagram of rescheduling a first command queue into a second command queue in a memory controller provided by examples of the present disclosure.

The eight commands shown in FIG. 11 are evenly grouped, and in some examples, may be divided into four groups, i.e., the command set 1=(the command 1 (DA=0), the command 3 (DA=1), the command 5 (DA=2)), the command set 2=(the command 2 (DA=0), the command 4 (DA=1), the command 6 (DA=2)), and the command set 3=(the command 8 (DA=1), the command 7 (DA=3)).

In this example, a situation where the number of the constituted command sets is minimum while the processing of each command set each time occupies like resources may be realized, such that a situation of lagging caused by insufficient memory due to excessive write requests contained in one command set is avoided.

In some other examples, the preset value may further be another numerical value, and may be set according to actual application requirements. The present disclosure is not limited thereto.

Figure 12:
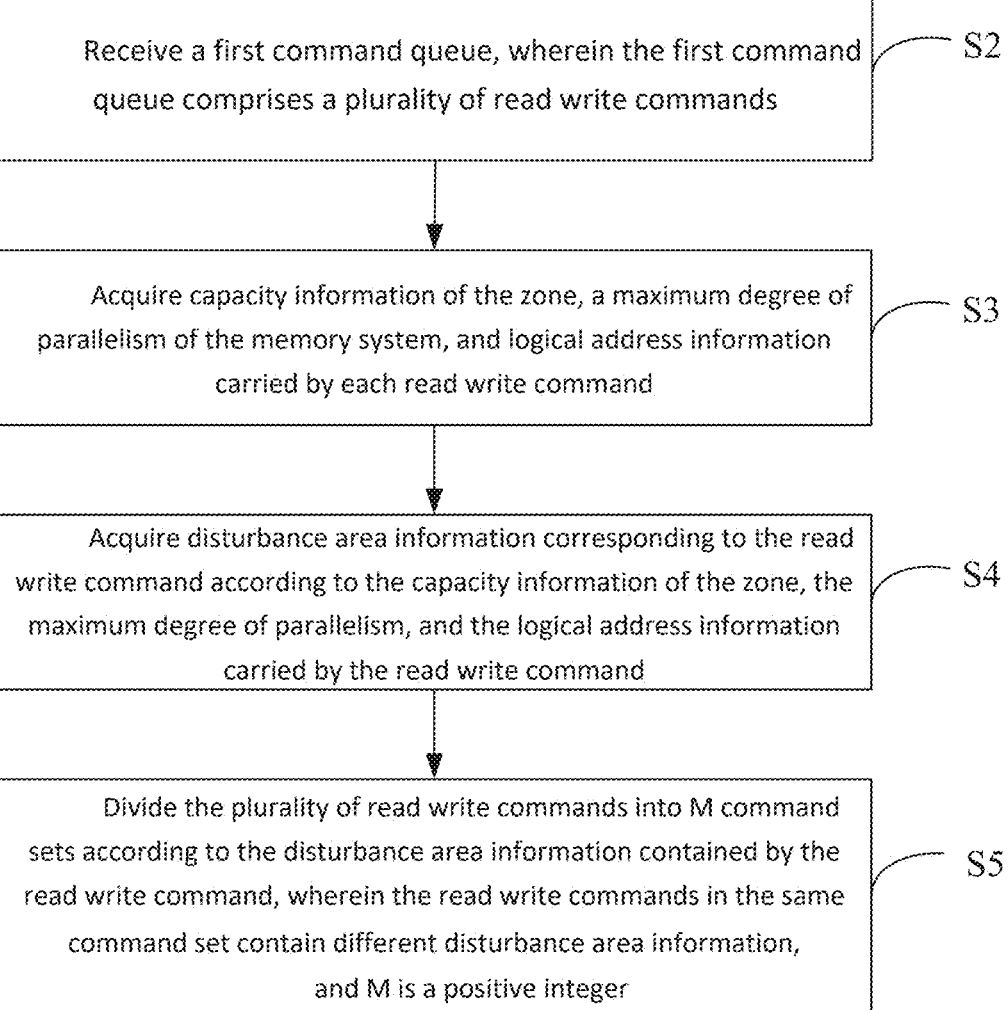
FIG. 12 is a flow diagram of an operation method of a memory controller provided by examples of the present disclosure.

Examples of the present disclosure further provide an operation method of a memory system, wherein the memory system comprises a memory device and a memory controller coupled with the memory device and supports a zone namespace function; the memory system comprises the memory device, and the memory device comprises K dies; the K dies are divided into N disturbance areas, each disturbance area comprises at least one die, and one block in each die in the disturbance area constitutes a zone jointly; K and N are positive integers greater than or equal to 2; as shown in FIG. 12, the method comprises:

S2, receiving a first command queue, wherein the first command queue comprises a plurality of read write commands;

S3, acquiring capacity information of the zone, a maximum degree of parallelism of the memory system, and logical address information carried by each read write command;

S4, acquiring disturbance area information corresponding to the read write command according to the capacity information of the zone, the maximum degree of parallelism, and the logical address information carried by the read write command; and S5, dividing the plurality of read write commands into M command sets according to the disturbance area information contained by the read write command, wherein the read write commands in the same command set contain different disturbance area information, and M is a positive integer.

In the examples of the present disclosure, the M command sets are obtained by rescheduling the plurality of received read write commands, and the read write operation is performed on the zones respectively corresponding to the plurality of read write commands in the same command set at the same time. Since the zones corresponding to the plurality of read write commands in the same command set belong to different disturbance areas, the zones occupy a plurality of unrepeated dies, so that even if the respective operation is performed on the plurality of zones at the same time, a die busy does not occur while the degree of IO parallelism is increased. Moreover, since the size of each zone in the present disclosure is less than the size of one virtual block, the garbage collection overhead is reduced.

In some examples, the dividing the plurality of read write commands into M command sets according to the disturbance area information contained by the read write command comprises:

dividing the plurality of read write commands into M command groups according to the disturbance area information contained by the read write command, wherein the read write commands in the same command group correspond to the same disturbance area information; and performing a second operation repeatedly M times to obtain the M command sets, wherein the second operation comprises selecting one read write command from each command group to constitute one command set, and the same read write command is contained in only one command set.

In some examples, the method further comprises:

performing a read write operation on zones respectively corresponding to the plurality of read write commands in the same command set at the same time.

An example implementation of the method in the above example is described in detail in examples of a product corresponding to the method, and is no longer set forth in detail here.

Examples of the present disclosure further provide an electronic apparatus, wherein the electronic apparatus comprises a host and a memory system which is coupled with the host and supports a zone namespace function. The memory system comprises a memory device, and the memory device comprises K dies; the K dies are divided into N disturbance areas, each disturbance area comprises at least one die, and one block in each die in the disturbance area constitutes a zone jointly; K and N are positive integers greater than or equal to 2; the host is configured to:

send a command to the memory system to perform a respective operation on zones corresponding to the command at the same time, wherein the zones corresponding to the command belong to different disturbance areas.

The memory system is configured to:

receive the command to perform the respective operation on the zones corresponding to the command at the same time.

In the examples of the present disclosure, the electronic apparatus includes, but is not limited to, a personal calculator, a digital camera, a mobile phone, a smart watch, smart home, etc.

It is to be understood that "one example" and "an example" mentioned throughout the specification mean that specific features, structures or characteristics related to the example is included in at least one example of the present disclosure. Therefore, "in one example" or "in an example" present at any place of the entire specification does not always refer to the same example. In addition, these specific features, structures or characteristics may be combined in one or more examples in any proper manner. It is to be understood that, in various examples of the present disclosure, the sequence number of each process does not mean the sequence of execution. The execution sequence of each process should be determined by its functions and internal logic, which should not constitute any limitation on the implementation process of the examples of the present disclosure. The serial numbers of the foregoing examples of the present disclosure are merely for description, and do not represent the superiority or inferiority of the examples.

It is to be noted that terms "include" and "comprise" or any other variant thereof is intended to cover nonexclusive inclusions herein, so that a process, method, object or apparatus including a series of components not only includes those components but also includes other components which are not clearly listed or further includes components intrinsic to the process, the method, the object or the apparatus. An element defined by a statement "comprising one" do not preclude the presence of another identical element in the process, method, article or device comprising this element, without more limitations.

In view of this, examples of the present disclosure provide a host and an operation method thereof, a memory system and an operation method thereof, and an electronic apparatus.

In a first aspect, examples of the present disclosure provide a host, wherein the host is coupled with a memory system supporting a zone namespace function; the memory system comprises a memory device, and the memory device comprises K dies; the K dies are divided into N disturbance areas, each disturbance area comprises at least one die, and one block in each die in the disturbance area constitutes a zone jointly; K and N are positive integers greater than or equal to 2; the host is configured to: send a command to the memory system to perform a respective operation on zones corresponding to the command at the same time, wherein the zones corresponding to the command belong to different disturbance areas.

In a second aspect, examples of the present disclosure provide an operation method of a host, wherein the host is coupled with a memory system supporting a zone namespace function; the memory system comprises a memory device, and the memory device comprises K dies; the K dies are divided into N disturbance areas, each disturbance area comprises at least one die, and one block in each die in the disturbance area constitutes a zone jointly; K and N are positive integers greater than or equal to 2; the method comprises: sending a command to the memory system to perform a respective operation on zones corresponding to the command at the same time, wherein the zones corresponding to the command belong to different disturbance areas.

In a third aspect, examples of the present disclosure provide a memory system, wherein the memory system comprises a memory device and a memory controller coupled with the memory device and supports a zone namespace function; the memory device comprises K dies; the K dies are divided into N disturbance areas, each disturbance area comprises at least one die, and one block in each die in the disturbance area constitutes a zone jointly; K and N are positive integers greater than or equal to 2; the memory controller is configured to: receive a first command queue, wherein the first command queue comprises a plurality of read write commands; acquire capacity information of the zone, a maximum degree of parallelism of the memory system, and logical address information carried by each read write command; acquire disturbance area information corresponding to the read write command according to the capacity information of the zone, the maximum degree of parallelism, and the logical address information carried by the read write command; and divide the plurality of read write commands into M command sets according to the disturbance area information contained by the read write command, wherein the read write command in the same command set contain different disturbance area information, and M is a positive integer.

In a fourth aspect, examples of the present disclosure provide an operation method of a memory system, wherein the memory system comprises a memory device and a memory controller coupled with the memory device and supports a zone namespace function; the memory system comprises the memory device, and the memory device comprises K dies; the K dies are divided into N disturbance areas, each disturbance area comprises at least one die, and one block in each die in the disturbance area constitutes a zone jointly; the K and N are positive integers greater than or equal to 2; the method comprises: receiving a first command queue, wherein the first command queue comprises a plurality of read write commands; acquiring capacity information of the zone, a maximum degree of parallelism of the memory system, and logical address information carried by each read write command; acquiring disturbance area information corresponding to the read write command according to the capacity information of the zone, the maximum degree of parallelism, and the logical address information carried by the read write command; and dividing the plurality of read write commands into M command sets according to the disturbance area information contained by the read write command, wherein the read write commands in the same command set contain different disturbance area information, and M is a positive integer.

In a fifth aspect, examples of the present disclosure provide an electronic apparatus, wherein the electronic apparatus comprises a host and a memory system which is coupled with the host and supports a zone namespace function; the memory system comprises a memory device, and the memory device comprises K dies; the K dies are divided into N disturbance areas, each disturbance area comprises at least one die, and one block in each die in the disturbance area constitutes a zone jointly; K and N are positive integers greater than or equal to 2; the host is configured to: send a command to the memory system to perform a respective operation on zones corresponding to the command at the same time, wherein the zones corresponding to the command belong to different disturbance areas; the memory system is configured to: receive the command to perform the respective operation on the zones corresponding to the command at the same time.

In the examples of the present disclosure, the host sends the command to the memory system to perform a respective operation on the plurality of zones corresponding to the command at the same time. Since the zones corresponding to the command belong to different disturbance areas, the zones occupy a plurality of unrepeated dies, so that even if the respective operation is performed on the plurality of zones at the same time, a die busy does not occur while the degree of IO parallelism is increased. Moreover, since the size of each zone in the present disclosure is less than the size of one virtual block, the garbage collection overhead is reduced.

The above descriptions are merely implementations of the present disclosure, and the protection scope of the present disclosure is not limited thereto. Any variation or replacement that may be readily figured out by those skilled in the art within the technical scope disclosed by the present disclosure shall fall within the protection scope of the present disclosure.

What is claimed is:

1. A system, comprising a host and a memory system coupled to the host wherein the host is configured to:

send a command to a memory system to perform a respective operation on zones corresponding to the command at the same time, wherein the zones corresponding to the command belong to different disturbance areas;

acquire disturbance areas to which a plurality of zones belong respectively;

select some zones from the plurality of zones as a plurality of target zones, wherein the plurality of target zones belong to different disturbance areas respectively; and send the command of writing to-be-written data to the plurality of target zones to the memory system, so as to perform a write operation on the plurality of target zones corresponding to the command at the same time;

wherein the memory system supporting a zone namespace function; the memory system includes a memory device, and the memory device includes K dies; the K dies are divided into N disturbance areas, each disturbance area includes at least one die, and one block in each die in the disturbance area constitutes a zone jointly; K and N are positive integers greater than or equal to 2.

2. The system of claim 1, wherein the host is further configured to:

generate a plurality of block input output requests, and acquire capacity information of the zone and a maximum degree of parallelism of the memory system, wherein each block input output request carries logical address information;

acquire disturbance area information corresponding to the block input output request according to the capacity information of the zone, the maximum degree of parallelism, and the logical address information carried by the block input output request;

add the corresponding disturbance area information to the block input output request and output the block input output request;

divide the plurality of block input output requests into M request sets according to the disturbance area information contained by the block input output request, wherein the block input output requests in the same request set contain different disturbance area information, and M is a positive integer; and generate M commands conforming to an interface standard of the memory system, wherein each command corresponds to one of the request sets.

3. The system of claim 2, wherein the plurality of block input output requests constitute at least one request group, and the block input output requests in the same request group carry the same disturbance area information; and M is equal to the number of block input output requests in a request group with a maximum number of block input output requests in at least one request group.

4. The system of claim 3, wherein the host is further configured to:

perform a first operation repeatedly M times to obtain the M request sets, wherein the first operation includes selecting one block input output request from each request group to constitute one request set, and the same block input output request is contained in only one request set.

5. The system of claim 2, wherein the host is configured to:

acquire the zone corresponding to the block input output request according to the capacity information of the zone and the logical address information carried by the block input output request; and acquire the disturbance area information corresponding to the block input output request according to the zone corresponding to the block input output request and the maximum degree of parallelism.

6. The system of claim 2, wherein the host is configured to:

send the command to the memory system to perform a read write operation on the zones corresponding to the request set corresponding to the command at the same time.

7. The system of claim 1, wherein the host is configured to:

acquire a start logical address of each zone of the memory system, the maximum degree of parallelism of the memory system, and capacity information of the zone; and acquire the disturbance areas to which the plurality of zones belong respectively according to the start logical address of each zone of the memory system, the maximum degree of parallelism of the memory system, and the capacity information of the zone.

8. The system of claim 1, wherein the host is configured to:

determine the number of required target zones according to hotness and a data type of the to-be-written data.

9. The system of claim 1, wherein the host is configured to:

determine the number of required target zones according to the number of applications from which the to-be-written data comes.

10. The system of claim 1, wherein the host is configured to:

reselect a new zone from the plurality of zones as a new target zone when one of the plurality of target zones is fully written, wherein the new target zone belongs to a disturbance area different from a disturbance area to which a not fully written target zone in the plurality of target zones belongs.

11. An operation method of a host, wherein the host is coupled with a memory system supporting a zone namespace function; the memory system includes a memory device, and the memory device includes K dies; the K dies are divided into N disturbance areas, each disturbance area includes at least one die, and one block in each die in the disturbance area constitutes a zone jointly; K and N are positive integers greater than or equal to 2; the method includes:

acquiring disturbance areas to which a plurality of zones belong respectively; and selecting some zones from the plurality of zones as target zones, wherein the plurality of target zones belong to different disturbance areas respectively; and sending a command to the memory system to perform a respective operation on zones corresponding to the command at the same time, wherein the zones corresponding to the command belong to different disturbance areas, the sending a command to the memory system to perform a respective operation on zones corresponding to the command at the same time includes:

sending the command of writing to-be-written data to the plurality of target zones to the memory system, so as to perform a write operation on the plurality of target zones at the same time.

12. The operation method of claim 11, wherein the method further includes:

generating a plurality of block input output requests, and acquiring capacity information of the zone and a maximum degree of parallelism of the memory system, wherein each block input output request carries logical address information;

acquiring disturbance area information corresponding to the block input output request according to the capacity information of the zone, the maximum degree of parallelism, and the logical address information carried by the block input output request;

adding the corresponding disturbance area information to the block input output request and output the block input output request;

dividing the plurality of block input output requests into M request sets according to the disturbance area information contained by the block input output request, wherein the block input output requests in the same request set contain different disturbance area information, and M is a positive integer; and generating M commands conforming to an interface standard of the memory system, wherein each command corresponds to one of the request sets.

13. The operation method of claim 12, wherein the dividing the plurality of block input output requests into M request sets according to the disturbance area information contained by the block input output request includes:

dividing the plurality of block input output requests into at least one request group, wherein the block input output requests in the same request group carry the same disturbance area information; and M is equal to the number of block input output requests in a request group with a maximum number of block input output requests in at least one request group.

14. The operation method of claim 13, wherein the dividing the plurality of block input output requests into M request sets according to the disturbance area information contained by the block input output request further includes:

performing a first operation repeatedly M times to obtain the M request sets, wherein the first operation includes selecting one block input output request from each request group to constitute one request set, and the same block input output request is contained in only one request set.

15. The operation method of claim 12, wherein the acquiring disturbance area information corresponding to the block input output request according to the logical address information carried by the block input output request, the capacity information of the zone and the maximum degree of parallelism includes:

acquiring the zone corresponding to the block input output request according to the capacity information of the zone and the logical address information carried by the block input output request; and acquiring the disturbance area information corresponding to the block input output request according to the zone corresponding to the block input output request and the maximum degree of parallelism.

16. The operation method of claim 11, wherein the sending a command to the memory system to perform a respective operation on zones corresponding to the command at the same time includes:

sending the command to the memory system to perform a read write operation on the zones corresponding to a request set corresponding to the command at the same time.

17. A memory system comprising:

a memory device that includes K dies; the K dies are divided into N disturbance areas, each disturbance area includes at least one die, and one block in each die in the disturbance area constitutes a zone jointly; K and N are positive integers greater than or equal to 2; and a memory controller coupled with the memory device, the memory controller supports a zone namespace function; the memory controller is configured to:

receive a first command queue, wherein the first command queue includes a plurality of read write commands;

acquire capacity information of the zone, a maximum degree of parallelism of the memory system, and logical address information carried by each read write command;

acquire disturbance area information corresponding to the read write command according to the capacity information of the zone, the maximum degree of parallelism, and the logical address information carried by the read write command; and divide the plurality of read write commands into M command sets according to the disturbance area information contained by the read write command, wherein the read write commands in the same command set contain different disturbance area information, and M is a positive integer.

18. The memory system of claim 17, wherein the memory controller is further configured to:

divide the plurality of read write commands into M command groups according to the disturbance area information contained by the read write command, wherein the read write commands in the same command group correspond to the same disturbance area information; and perform a second operation repeatedly M times to obtain the M command sets, wherein the second operation includes selecting one read write command from each command group to constitute one command set, and the same read write command is contained in only one command set.

* * * * *